US012683314B2

(12) United States Patent
Liu et al.

(10) Patent No.: US 12,683,314 B2
(45) Date of Patent: Jul. 14, 2026

(54) ELECTRICAL CONNECTOR

(71) Applicant: Tyco Electronics (Shanghai) Co., Ltd., Shanghai (CN)

(72) Inventors: Jiaoyong (Mac) Liu, Shanghai (CN); Hongqiang (Sean) Han, Shanghai (CN); Jie (Roger) Luo, Shunde (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 348 days.

(21) Appl. No.: 18/467,396

(22) Filed: Sep. 14, 2023

(65) Prior Publication Data

US 2024/0088592 A1 Mar. 14, 2024

(30) Foreign Application Priority Data

Sep. 14, 2022 (CN) .......................... 202211118310.4

(51) Int. Cl.
*H01R 13/11* (2006.01)
*H01R 25/14* (2006.01)

(52) U.S. Cl.
CPC ........... *H01R 13/11* (2013.01); *H01R 25/142* (2013.01); *H01R 25/145* (2013.01)

(58) Field of Classification Search
CPC .... H01R 13/11; H01R 25/142; H01R 25/145; H01R 13/113; H01R 13/18; H02B 1/20
See application file for complete search history.

(56) References Cited

U.S. PATENT DOCUMENTS

| | | | | |
|---|---|---|---|---|
| 2016/0276760 | A1* | 9/2016 | Luo | H01R 13/113 |
| 2021/0313729 | A1* | 10/2021 | Hung | H01R 13/113 |
| 2022/0029333 | A1* | 1/2022 | Horning | H01R 12/7088 |

FOREIGN PATENT DOCUMENTS

| | | | | |
|---|---|---|---|---|
| CN | 114976708 A | * | 8/2022 | H05K 7/2039 |

* cited by examiner

*Primary Examiner* — Travis S Chambers
(74) *Attorney, Agent, or Firm* — Barley Snyder

(57) ABSTRACT

An electrical connector includes a housing defining a slot in which a mating component can be at least partially inserted, a conductive terminal installed in the housing and having a contact end capable of electrically contacting the mating component, and a supporting member elastically supporting the contact end. The supporting member has a cantilever beam and a supporting arm extending from the cantilever beam. The cantilever beam at least partially abuts a first surface of the contact end facing an inner wall of the housing and applies an elastic force to the contact end. The supporting arm is positioned at least partially between the cantilever beam and the inner wall. The supporting arm elastically supports the cantilever beam and the contact end when pressed against the inner wall.

21 Claims, 7 Drawing Sheets

ELECTRICAL CONNECTOR

CROSS-REFERENCE TO RELATED APPLICATION

This application claims the benefit of the filing date under 35 U.S.C. § 119(a)-(d) of Chinese Patent Application No. 202211118310.4, filed on Sep. 14, 2022.

FIELD OF THE INVENTION

Embodiments of the disclosure generally relate to the field of connectors, and more specifically, relate to an electrical connector having a supporting effect for conductive terminals.

BACKGROUND

An electrical connector typically comprises a conductive terminal installed in a housing and configured to contact or clamp a mating component to provide electrical connection. In order to make the conductive terminal contact or clamp the mating component effectively, it is necessary to provide an auxiliary supporting member to provide supporting force to squeeze the conductive terminal, so that the conductive terminal can reliably contact the mating component.

In conventional technology, some auxiliary supporting members are limited by their own structures or installation environment and cannot reliably provide this supporting force, or require a larger thickness to provide sufficient and stable supporting force. Thicker supporting members occupy more space, which results in the space that can be occupied by the conductive terminal and other structure of the connector being constrained or even reduced.

SUMMARY

An electrical connector includes a housing defining a slot in which a mating component can be at least partially inserted, a conductive terminal installed in the housing and having a contact end capable of electrically contacting the mating component, and a supporting member elastically supporting the contact end. The supporting member has a cantilever beam and a supporting arm extending from the cantilever beam. The cantilever beam at least partially abuts a first surface of the contact end facing an inner wall of the housing and applies an elastic force to the contact end. The supporting arm is positioned at least partially between the cantilever beam and the inner wall. The supporting arm elastically supports the cantilever beam and the contact end when pressed against the inner wall.

BRIEF DESCRIPTION OF THE DRAWINGS

Features and advantages of the embodiments of the present disclosure will be more apparent from the following detailed description in conjunction with the accompanying drawings, in which.

DETAILED DESCRIPTION OF THE EMBODIMENTS

Figure 1:
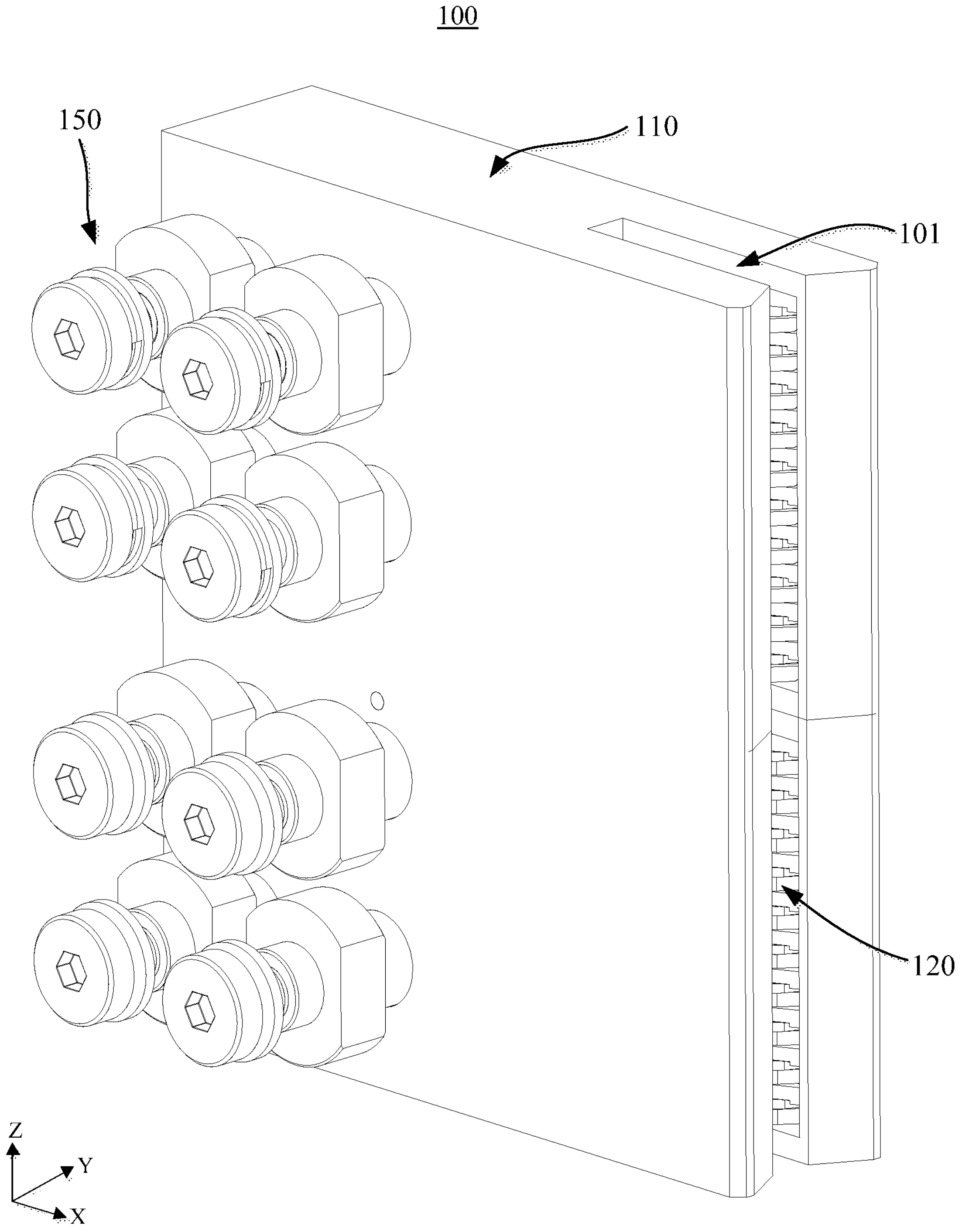
FIG. 1 is a perspective view schematically illustrating the structure of an electrical connector according to an exemplary embodiment of the present disclosure.

The following will provide a detailed description of the embodiments of the present disclosure in conjunction with the accompanying drawings. In this specification, the same or similar components are indicated by the same or similar reference numerals. The following explanations of the various embodiments of the present disclosure, made with reference to the accompanying drawings, are intended to elucidate the overall concept of the present disclosure and should not be construed as a limitation of the present disclosure.

In addition, in the following detailed description, many specific details have been elaborated to provide a comprehensive understanding of the embodiments of the present disclosure for ease of explanation. However, it is evident that one or more embodiments can also be implemented without these specific details. In other cases, well-known structures and devices are illustrated in a schematic way to simplify the accompanying drawings.

As shown in FIGS. 1-7, according to exemplary embodiments of the present disclosure, an electrical connector 100 is provided, and its supporting member can reliably provide supporting force to stably support conductive terminals, thereby reducing contact resistance. In the embodiment shown in FIG. 7, the electrical connector 100 can be a bus connector or a busbar connector, which is used to provide reliable electrical connection between a horizontal busbar 10 and a vertical busbar 20.

As shown in the figures, the electrical connector 100 comprises a housing 110 and conductive terminals 120 installed in the housing 110. The housing 110 is made of insulating material such as plastic and defines a slot 101 in which a mating component 20 can be at least partially inserted to electrically contact the conductive terminal(s) 120. In some examples, the slot 101 may have a centerline extending in a first direction X, and a mating component such as a busbar may be allowed to be at least partially inserted into the slot 101 in the first direction X to electrically contact conductive terminal(s) 120. In the illustrated embodiment, the slot 101 has sizes adapted for accommodating at least a part of the mating component (a connecting portion or an inserting portion to be described below), the sizes comprising a depth in the first direction X, a width in a second direction Y perpendicular to the first direction X, and a length in a third direction Z orthogonal to the first direction X and the second direction Y.

The conductive terminal 120 comprises a terminal body 121 and a contact end 122. In some examples, the contact end 122 can be positioned to at least partially expose from the slot 101; and the contact end 122 is configured to be in electrical contact with the inserted mating component; the contact may be surface contact, line contact or point contact. For example, the conductive terminal 120 may also comprise an elastic arm extending from the terminal body 121 (e.g., extending in the first direction X), and the contact end 122 is formed as a free end of the elastic arm. It will be understood that unless otherwise explicitly stated, expressions used therein such as "end" and "end portion" are not only limited to a tip or endpoint of a component, but can refer to a segment or part of the component having a certain length or size and comprising the tip or endpoint.

As shown in FIGS. 2 to 6C, the electrical connector 100 also comprises a supporting member (130, 130') configured to at least elastically support (such as squeeze) the contact end 122 so that the contact end 122 can reliably contact the inserted mating component. For example, the supporting member (130, 130') can be fully or partially arranged between the conductive terminals 120 and the inner wall of the housing 110 in the second direction Y. In an exemplary embodiment according to the present disclosure, the supporting member (130, 130') comprises: a cantilever beam (131, 131') configured to at least partially abut against the first surface of the contact end 122 facing the inner wall of the housing 110 to apply an elastic force to the contact end 122 (for example, to apply an elastic force to the contact end 122 towards the centerline of the slot 101); and a supporting arm (132, 132') extending from the cantilever beam (131, 131') and configured to be at least partially positioned between the cantilever beam (131, 131') and the inner wall of the housing 110 to elastically support the cantilever beam (131, 131') and the contact end 122 when pressed against the inner wall of the housing 110.

For example, the supporting member (130, 130') may be configured such that the contact end 122 is supported only by the cantilever beam (131, 131') in a first state where the force applied to the cantilever beam (131, 131') is less than or equal to a threshold, for example the cantilever beam is elastically deformed to provide the elastic force for supporting when it is subjected to force; the contact end 122 is supported by both the cantilever beam (131, 131') and the supporting arm (132, 132') in a second state where the force applied to the cantilever beam (131, 131') is greater than the threshold, for example both the cantilever beam and the supporting arm are elastically deformed to provide the elastic force for jointly supporting the contact end. In some examples, the force applied to the cantilever beam (131, 131') mainly comes from the insertion or compression of the mating component, that is, the inserted mating component causes deformation or displacement of the conductive terminal or contact end, and then the cantilever beam is subjected to a force so as to provide the elastic support. The threshold may depend on factors such as the material, structure, space position of the installation, insertion or extrusion force to be borne, of the supporting member. For example, the supporting member is a one-piece structure formed from elastically deformable material. For example, the supporting member may be made of an elastically deformable material with an expected rigidity, such as stainless steel.

Therefore, the supporting member according to exemplary embodiments of the present disclosure can provide a two-step load-bearing supporting structure, comprising a cantilever beam as a first-step load-bearing structure and a supporting arm as a second-step load-bearing structure. Depending on the specific application, when the cantilever beam is subjected to a small force, only the elastic deformation of the cantilever beam itself determined by its rigidity, elastic performance and structure can provide sufficient supporting force to support the squeezed contact end, and at this time, the supporting arm does not work or does not need to provide supporting force. When the cantilever beam is subjected to a large force and the cantilever beam itself is deformed to a certain extent but still cannot provide sufficient supporting force, the supporting arm extending from the cantilever beam begins to contact the inner wall of the housing, and at this time, the supporting arm begins to work or deform elastically to provide additional supporting force so as to support the contact end of the squeezed conductive terminal together with the cantilever beam.

The supporting member according to the exemplary embodiments of the disclosure can provide suitable and sufficient terminal supporting force for the extrusion force for example caused by the insertion of mating components of different sizes, ensuring that the contact end of the conductive terminal (e.g., an opposite second surface of the contact end) always maintains reliable contact with the inserted mating component, reducing contact impedance; moreover, compared to conventional auxiliary supporting members, the thickness of the two-step load-bearing supporting member provided by the exemplary embodiment of the present disclosure can be reduced while providing the same supporting force or supporting effect, thereby saving installation space and allowing the conductive terminal to occupy more installation space, for example, the size, the thickness and the like of the conductive terminal or the contact end thereof can be increased to reduce contact impedance and improve current carrying capacity. For example, compared to the conventional stainless steel auxiliary supporting member with a thickness of 0.7 mm, the thickness of the supporting member according to the exemplary embodiment of the present disclosure can be reduced to 0.20 mm, saving 71.4% in thickness, but still providing sufficient or equivalent supporting force or supporting effect.

Figure 3:
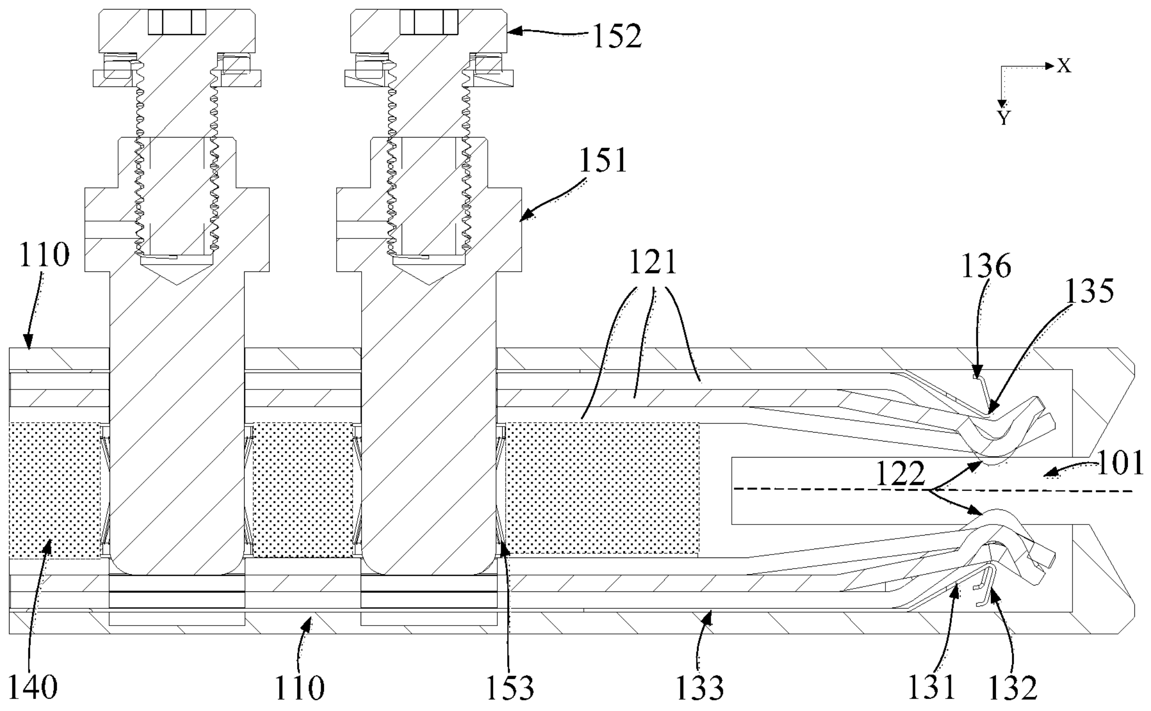
FIG. 3 is a cross-sectional view schematically illustrating the structure of an electrical connector according to an exemplary embodiment of the present disclosure.

In some embodiments, in the first state, the supporting arm (132, 132') can be separated from the inner wall of the housing 110 (as shown in FIG. 3) or slightly contact the inner wall of the housing but not work or deform, while in the second state, due to the deformation of the cantilever beam (131, 131') under force, the supporting arm (132, 132') begins to contact and abut against the inner wall of the housing 110, resulting in being elastically deformed to provide elastic force for supporting both the cantilever beam (131, 131') and the contact end 122.

In the illustrated embodiment, the supporting member (130, 130') further comprises a main body (133; 133'), which can be fixed relative to the conductive terminal 120, for example, be detachably installed to the terminal body 121 of the conductive terminal 120 by a fastener 102 (see FIG. 2), fixed to the terminal body 121 through adhesive, or only fixedly clamped between the terminal body 121 and the inner wall of the housing 110. The cantilever beam (131, 131') is configured to extend in a form of a cantilever or be suspended between the main body (133, 133') and the supporting arm (132, 132') to facilitate being elastically deformed under force, but the main body (133, 133') of the supporting member (130, 130') remains stationary relative to the conductive terminal.

As shown in FIGS. 2 to 6C, the cantilever beam (131, 131') can extend obliquely (for example, relative to the first direction X) from the main body (133, 133') of the supporting member to the contact end 122 of the electrical terminal 120, so that there is a space between the cantilever beam (131, 131') and the inner wall of the housing 110, in which space the cantilever beam (131, 131') and/or the supporting arm (132, 132') are adapted to elastically deform. The end of the cantilever beam (131, 131') away from the main body (133, 133') of the supporting member can be formed or provided with a first abutting portion (135, 135') for contacting the contact end 122, and the supporting arm (132, 132') is configured to extend from the first abutting portion (135, 135') and has a second abutting portion (136, 136') for abutting against the inner wall of the housing 110.

FIGS. 2 to 4B illustrate the specific structures of the supporting member 130 according to exemplary embodiments of the present disclosure. As shown in the figures, the supporting member 130 is provided between the outer side of the conductive terminal 120 (e.g., the outer side of the conductive terminal 120 in the second direction Y) and the inner wall of the housing 110 to provide elastic support for at least the contact end 122 of the elastic arm of the conductive terminal 120. The supporting member 130 comprises a main body 133, a cantilever beam 131 extending from the main body 133 in a form of the cantilever, and a supporting arm 132 extending from the cantilever beam 131. For example, the main body 133 can be formed with a connection hole 134, and the main body 133 can be fixed to the terminal body 121 through a fastener inserted into the connection hole 134 (for example, a first fastener 151 to be described below). The cantilever beam 131 may extend obliquely (for example, relative to the centerline of the slot 101) from the main body 133 towards the corresponding contact end 122 and away from the inner wall of the housing 110. The end of the cantilever beam 131 away from the main body 133 is configured to form a first abutting portion 135 for contacting and supporting the contact end 122. The supporting arm 132 is configured to extend (for example, obliquely) from the cantilever beam 131 towards the inner wall of the housing 110, and the free end of the supporting arm 132 is formed with a second abutting portion 136 for abutting against the inner wall of the housing 110. The second abutting portion 136 may be separated from the inner wall of the housing 110 in a non-working or first state, or slightly contact the inner wall of the housing 110 without causing deformation of the supporting arm 132. In the illustrated embodiment, the cantilever beam 131 and the supporting arm 132 are in a cantilever form as a whole, forming a substantially V-shaped structure opening towards the inner wall of the housing 110 so as to form a two-step load-bearing supporting structure. As an example, an elastic material plate, such as a stainless steel plate, may be processed by processes such as stamping, cutting, and bending to form a supporting member 130 into one piece.

Thus, in the first state where the force applied to the cantilever beam 131 by the contact end 122 or by both the contact end 122 and the inserted mating component is less than or equal to the threshold, the cantilever beam 131 will be elastically deformed under the force, providing sufficient elastic force to support the contact end 122 and/or the inserted mating component. In the second state where the force applied to the cantilever beam 131 is greater than the threshold, the deformation of the cantilever beam 131 causes the supporting arm 132 to begin to abut against the inner wall of the housing 110, and both the cantilever beam 131 and the supporting arm 133 are elastically deformed to generate a sufficient elastic force so as to jointly support the contact end 122 and/or the inserted mating component.

Figure 5:
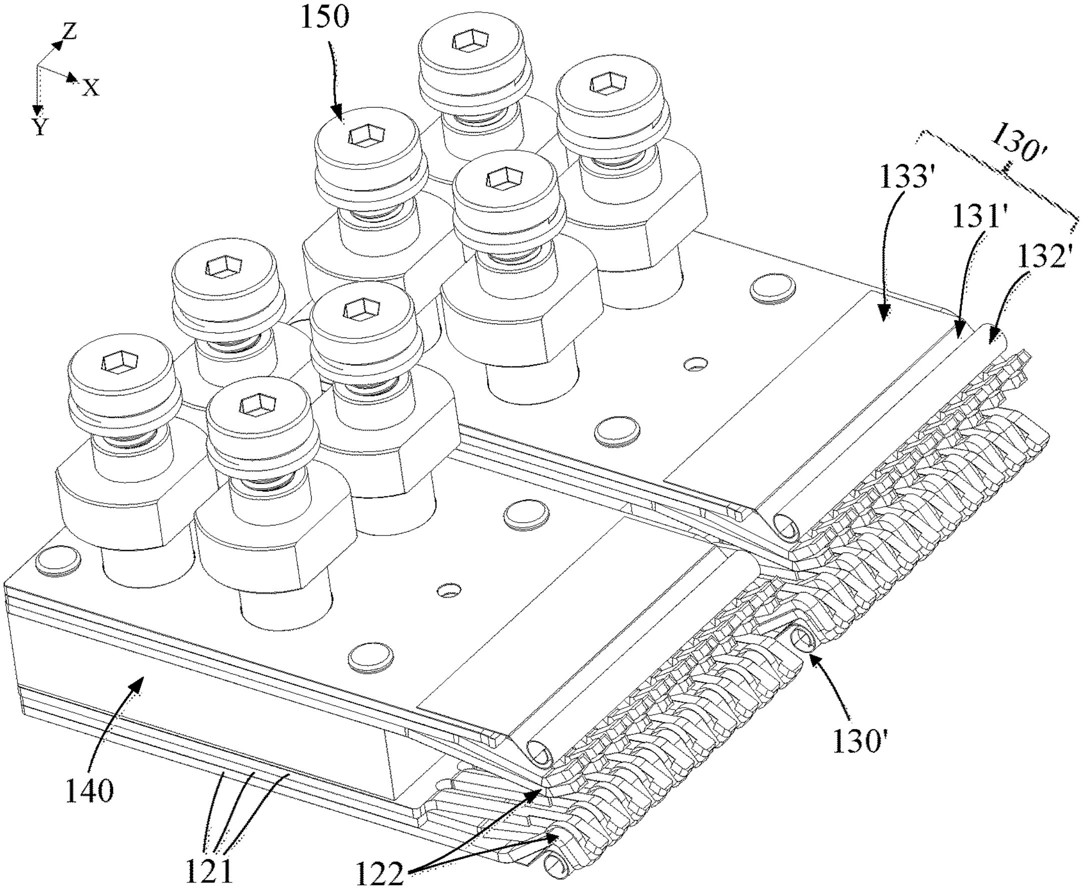
FIG. 5 is a perspective view schematically illustrating the structure of an electrical connector according to another exemplary embodiment of the present disclosure, wherein a housing is removed.
Figure 6A:
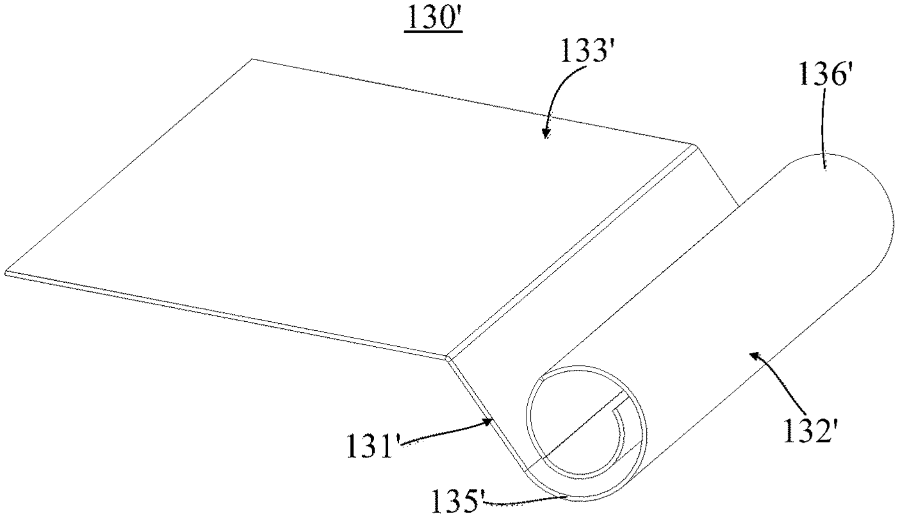
FIG. 6A is a perspective view schematically illustrating the structure of a supporting member according to another exemplary embodiment of the present disclosure.
Figure 6B:
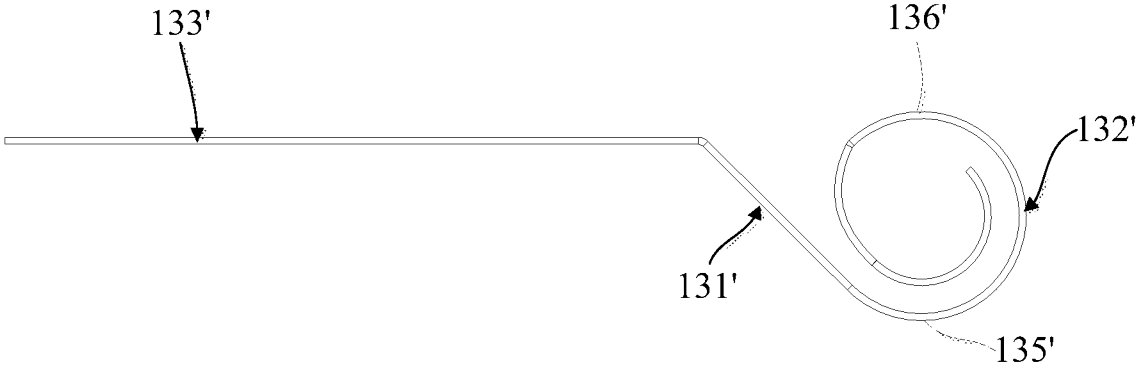
FIG. 6B is a side view schematically illustrating the structure of a supporting member according to a further exemplary embodiment of the present disclosure.
Figure 6C:
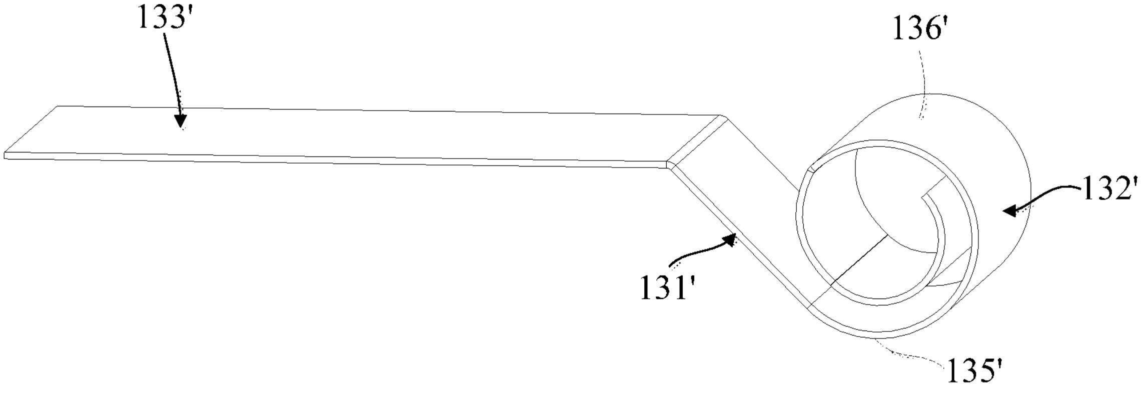
FIG. 6C is a side perspective view schematically illustrating the structure of a supporting member according to another further exemplary embodiment of the present disclosure.

FIGS. 5 to 6C illustrate the specific structure of the supporting member 130' according to another exemplary embodiment of the present disclosure. As shown in the figures, the supporting member 130' is provided between the outer side of the conductive terminal 120 (e.g., the outer side of the conductive terminal 120 in the second direction Y) and the inner wall of the housing 110 to provide elastic support for at least the contact end 122 of the elastic arm of the conductive terminal 120. The supporting member 130' comprises a main body 133', a cantilever beam 131' extending from the main body 133' in a cantilever form, and a supporting arm 132' extending from the cantilever beam 131'. The cantilever beam 131' may extend obliquely (for example, relative to the centerline of the slot 101) from the main body 133' towards the corresponding contact end 122' and away from the inner wall of the housing 110. The end of the cantilever beam 131' away from the main body 133' is formed with a first abutting portion 135' for contacting and supporting the contact end 122. The supporting arm 132' is configured to spirally extend from the cantilever beam 131' to the inner wall of the housing 110, forming a form of a single layer or more layers of spiral tubes. The supporting arm 132' in this form has better elastic deformation performance to provide better support. In this case, the outer peripheral surface of the supporting arm 132' adjacent to the inner wall of the housing 110 is configured to form a second abutting portion 136'. Similarly, the second abutting portion 136' may be separated from the inner wall of the housing 110 in a non-working or first state, or slightly contact the inner wall of the housing 110 without causing deformation of the supporting arm 132', while the second abutting portion 136' will abut against the inner wall of the housing 110 in a working or second state so that the supporting arm 132' begins to be deformed to provide elastic support. As an example, an elastic material plate, such as a stainless steel plate, may also be processed by processes such as stamping, cutting, and bending to form a supporting member 130' into one piece.

Thus, in the first state where the force applied to the cantilever beam 131' by the contact end 122 or by both the contact end 122 and the inserted mating component is less than or equal to the threshold, the cantilever beam 131' will be elastically deformed under the force, providing a sufficient elastic force to support the contact end 122 and/or the inserted mating component. In the second state where the force applied to the cantilever beam 131' is greater than the threshold, the deformation of the cantilever beam 131' causes the supporting arm 132' to abut against the inner wall of the housing 110, and both the cantilever beam 131' and the supporting arm 133' are elastically deformed to generate a sufficient elastic force so as to jointly support the contact end 122 and/or the inserted mating component.

Figure 2:
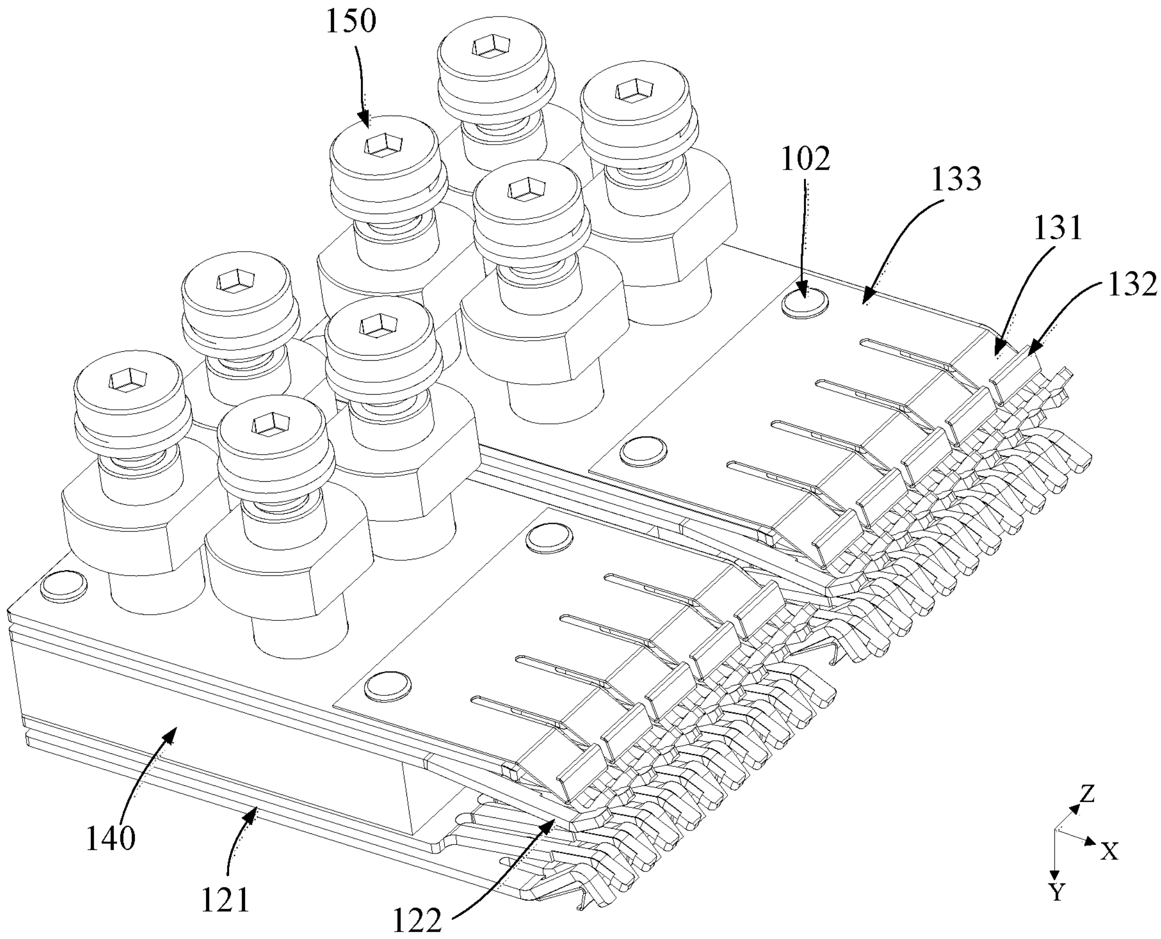
FIG. 2 is a perspective view schematically illustrating the structure of an electrical connector according to an exemplary embodiment of the present disclosure, wherein a housing is removed.

In some embodiments, the electrical connector 100 may comprise multiple or multiple sets of conductive terminals 120, which may be arranged in the third direction Z, for example. As shown in FIGS. 1, 2 and 5, the electrical connector 100 also comprises a supporting block 140, and at least two rows of conductive terminals 120 are provided separately on the opposite sides of the supporting block 140 in the second direction Y, for example, detachably fixed via a fastening assembly 150. As an example, the fastening assembly 150 may comprise a first fastener 151, such as a bolt, which is inserted through a through hole in the housing 110, a connection hole 134 of the supporting member, a through hole in the terminal body 121 and a through hole in the supporting block 140 so as to fix the supporting member and conductive terminal relative to the supporting block 140. The gap between the contact ends 122 of the two opposite rows of conductive terminals 120 allows the mating component to be inserted therein. Each or each set of conductive terminals 120 may comprise a single-layer terminal structure or multi-layer terminal structure (e.g., those shown in FIGS. 2, 3 and 5), with the main body 121 of the multi-layer terminal structure being stacked on the surface of the supporting block 140 in the second direction Y, and the contact ends 122 of the multi-layer terminal structure may be staggered with each other in the third direction Z, for example.

Figure 4A:
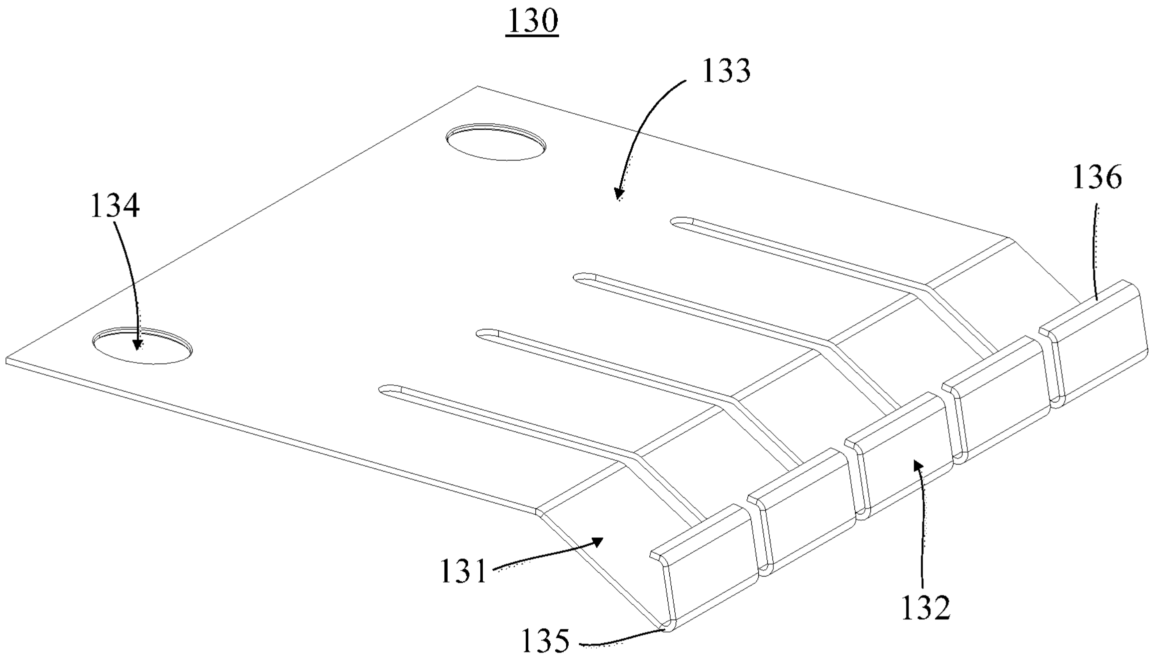
FIG. 4A is a perspective view schematically illustrating the structure of a supporting member of an electrical connector according to an exemplary embodiment of the present disclosure.
Figure 4B:
FIG. 4B is a side view schematically illustrating the structure of a supporting member of an electrical connector according to an exemplary embodiment of the present disclosure.

The supporting member 130 or 130' is configured to support the contact ends 122 on the outer side of each row of the conductive terminals 120 (that is, the outer side when viewed in the second direction Y). In some examples, as shown in FIGS. 2, 4A and 6C, the supporting member (130, 130') comprises one or more supporting branches, each of which is a two-step load-bearing structure comprising a cantilever beam (131, 131') and a supporting arm (132, 132'). Each of the supporting branches can support the contact ends 122 of one or more conductive terminals 120, or support multiple contact ends of the same multi-layer conductive terminal, for example, the three contact ends 122 of the three-layer conductive terminal 120 shown in the figures. In other examples, as shown in FIGS. 5 and 6A, each supporting member may be formed into one piece to support one or more rows of conductive terminals.

Figure 7:
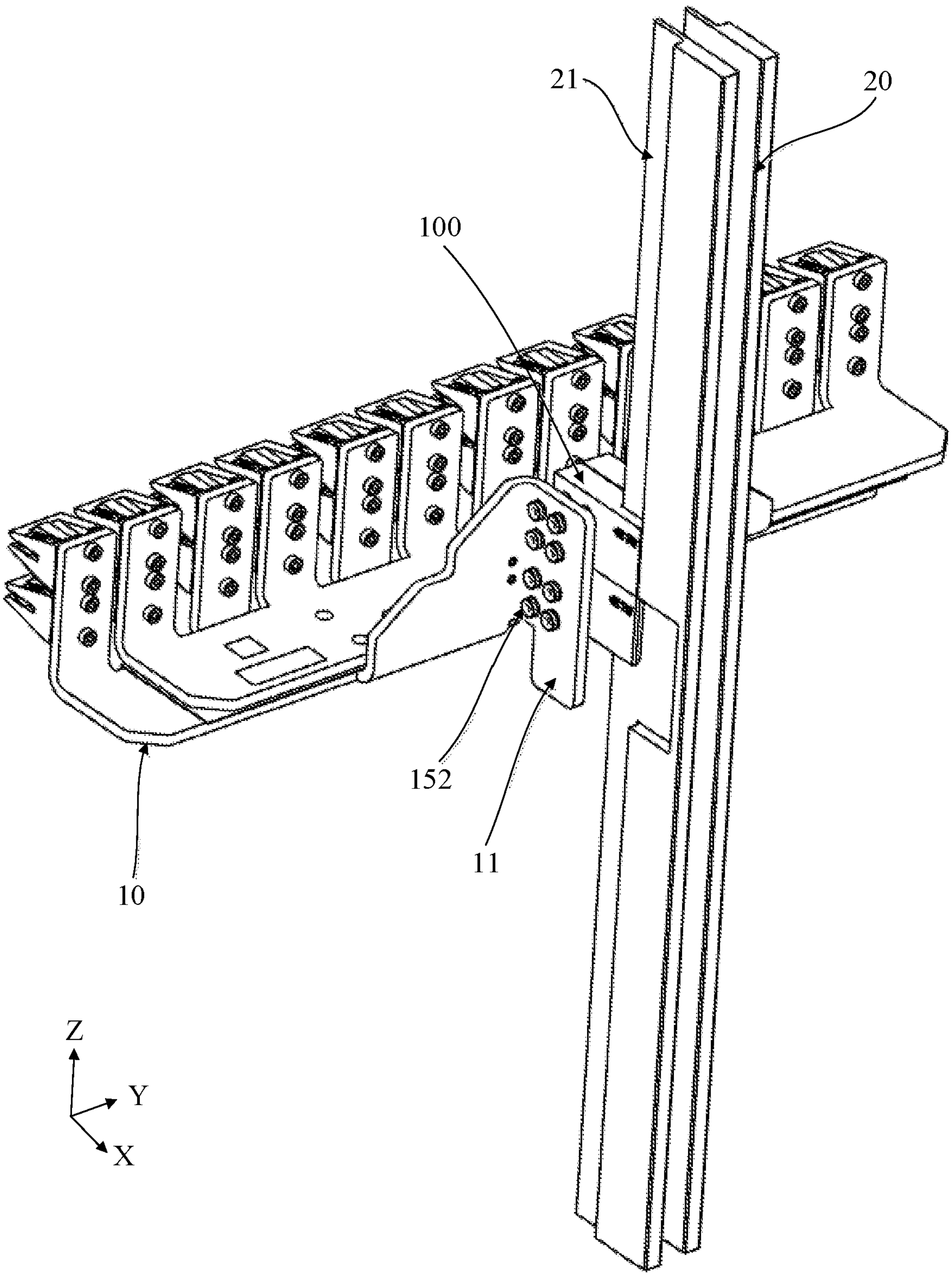
FIG. 7 is a schematic diagram illustrating the state of an electrical connector according to an exemplary embodiment of the present disclosure connecting a horizontal busbar and a vertical busbar.

The electrical connector 100 provided according to the exemplary embodiments of the present disclosure can be used for various purposes, for example functioning as a socket connector, or functioning as a bus connector or busbar connector to connect a horizontal busbar 10 and a vertical busbar 20, as shown in FIG. 7. The horizontal busbar 10 is configured to have a connection portion 11, and the vertical busbar 20 is configured to have a connection portion 21, and the connection portion of one of the horizontal busbar and the vertical busbar is adapted to be inserted into the slot 101 of the electrical connector 100 to electrically connect the conductive terminal(s) 120. As shown in FIG. 7, the connection portion 21 of the vertical busbar 20 is at least partially inserted into the slot 101 of the electrical connector 100. In some examples, the connection portion 21 of the vertical busbar 20 may slide operably in the slot 101 in the vertical or third direction Z, thereby better adapting to different installation environments. As shown in FIGS. 1-3, 5 and 7, the fastening assembly 150 can also comprise a second fastener 152, such as a screw, which may connect the connection portion 11 of the horizontal busbar 10 to the first fastener 151. The first fastener 151 and the second fastener 152 are both conductive components, so that the horizontal busbar 10 can be electrically connected to the conductive terminal 120 and further connected to the vertical busbar. In addition, the supporting block 140 may also be a conductive component that contacts the terminal body 121 to provide a more reliable electrical connection between the first fastener 151 and the conductive terminal 120. As shown in FIG. 3, the fastening assembly 150 may also comprise a conductive elastic sheet 153, which may be positioned in the through hole of the conductive supporting block 140 to provide a more reliable electrical connection between the first fastener 151 and the conductive supporting block 140.

Although several embodiments of the present disclosure have been shown and described, it would be appreciated by those skilled in the art that changes may be made in these embodiments without departing from the principles and spirit of the present disclosure, and the protection scope of the present disclosure is defined by the claims and their equivalents. Additionally, it is to be noted that the terms "comprising", "including", "having" used therein do not exclude other components or steps. Furthermore, any reference numerals in the claims shall not be construed as limiting the scope of the disclosure.

What is claimed is:

1. An electrical connector, comprising:

a housing defining a slot in which a mating component can be at least partially inserted;

a conductive terminal installed in the housing and having a contact end capable of electrically contacting the mating component; and a supporting member elastically supporting the contact end, the supporting member has a cantilever beam and a supporting arm extending from the cantilever beam, the cantilever beam at least partially abutting a first surface of the contact end facing an inner wall of the housing and applying an elastic force to the contact end, the supporting arm positioned at least partially between the cantilever beam and the inner wall, the supporting arm elastically supporting the cantilever beam and the contact end when pressed against the inner wall.

2. The electrical connector according to claim 1, wherein the contact end is supported only by the cantilever beam in a first state in which the elastic force applied to the cantilever beam is less than or equal to a threshold, and the contact end is supported by both the cantilever beam and the supporting arm in a second state in which the elastic force applied to the cantilever beam is greater than the threshold.

3. The electrical connector according to claim 2, wherein the supporting arm is spaced apart from the inner wall in the first state and abuts against the inner wall in the second state to elastically support the cantilever beam and the contact end.

4. The electrical connector according to claim 2, wherein the cantilever beam deforms elastically in the first state to support the contact end, and both the cantilever beam and the supporting arm deform elastically in the second state to support the contact end.

5. The electrical connector according to claim 1, wherein the supporting member is arranged between the conductive terminal and the inner wall of the housing.

6. The electrical connector according to claim 2, wherein the supporting member is arranged between the conductive terminal and the inner wall of the housing.

7. The electrical connector according to claim 1, wherein the supporting member has a main body fixed relative to the conductive terminal, the cantilever beam extends between the main body and the supporting arm.

8. The electrical connector according to claim 2, wherein the supporting member has a main body fixed relative to the conductive terminal, the cantilever beam extends between the main body and the supporting arm.

9. The electrical connector according to claim 7, wherein the cantilever beam extends obliquely from the main body to the contact end, and there is a space between the cantilever beam and the inner wall in which the cantilever beam and/or the supporting arm elastically deform.

10. The electrical connector according to claim 8, wherein the cantilever beam extends obliquely from the main body to the contact end, and there is a space between the cantilever beam and the inner wall in which the cantilever beam and/or the supporting arm elastically deform.

11. The electrical connector according to claim 9, wherein an end of the cantilever beam away from the main body forms a first abutting portion contacting the first surface of the contact end, the supporting arm extends from the first abutting portion and has a second abutting portion abutting against the inner wall.

12. The electrical connector according to claim 9, wherein the cantilever beam and the supporting arm form a substantially V-shaped structure opening towards the inner wall.

13. The electrical connector according to claim 9, wherein the supporting arm forms a spiral shape extending from the cantilever beam.

14. The electrical connector according to claim 13, wherein the supporting arm has a single layer or a plurality of layers of spiral tubes.

15. The electrical connector according to claim 1, wherein the conductive terminal is one of a plurality of conductive terminals, the supporting member has one or more supporting branches, each of the supporting branches has the cantilever beam and the supporting arm and supports the contact end of one or more of the conductive terminals.

16. The electrical connector according to claim 2, wherein the conductive terminal is one of a plurality of conductive terminals, the supporting member has one or more supporting branches, each of the supporting branches has the cantilever beam and the supporting arm and supports the contact end of one or more of the conductive terminals.

17. The electrical connector according to claim 1, wherein the supporting member is a one-piece structure that is elastically deformable.

18. The electrical connector according to claim 2, wherein the supporting member is a one-piece structure that is elastically deformable.

19. The electrical connector according to claim 17, wherein the supporting member is a stainless steel member.

20. The electrical connector according to claim 1, wherein the electrical connector is a busbar connector for connecting a horizontal busbar and a vertical busbar, and a connecting portion of one of the horizontal busbar and the vertical busbar is inserted in the slot.

21. The electrical connector according to claim 1, wherein the supporting arm is at a distal end of the supporting member.

* * * * *